July 23, 1963  J. B. WEST  3,098,383
METHOD AND MEANS FOR DETERMINING GAS FLOW VELOCITY
Filed Sept. 22, 1960
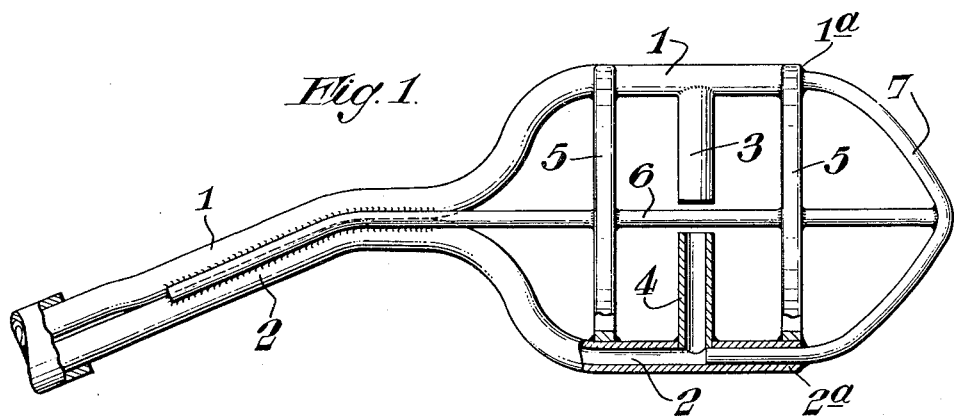
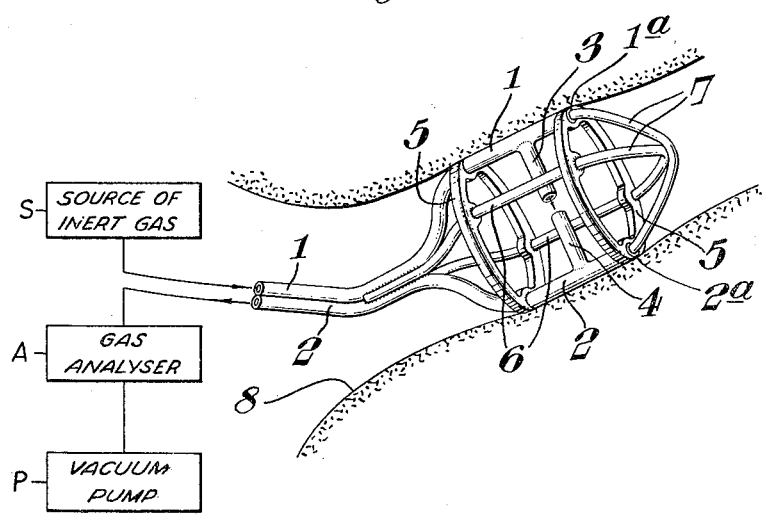
Inventor
JOHN BURNARD WEST
By Cameron, Kerkam & Sutton
Attorneys United States Patent Office 3,098,383
Patented July 23, 1963

3,098,383
METHOD AND MEANS FOR DETERMINING GAS FLOW VELOCITY
John Burnard West, London, England, assignor to National Research Development Corporation, London, England, a British corporation
Filed Sept. 22, 1960, Ser. No. 57,802
Claims priority, application Great Britain Sept. 29, 1959
5 Claims. (Cl. 73—194)

This invention relates to a method of and means for determining gas flow velocity through tubular ducts, and is particularly applicable to the determination of the velocity of flow of bronchial gas through bronchial passages; the bronchial gas is, of course, mainly air conditioned and modified according to the respiratory processes. The invention is, however, applicable to the measurement of flow velocity of gases through tubes in general.

According to the invention a method for determining the velocity of flow of a gas (herein termed the subject gas) through a tubular duct consists of leading argon or other suitable inert gas by a tube to a point in the duct conveying the subject gas, forcing the inert gas as a jet across the path of the subject gas where it is deflected to a greater or less extent by the incidence of the stream of subject gas, dependent upon the flow velocity of the latter, whereupon the remanent inert gas jet is directed into a second tube, then conducting the remanent inert gas with any entrained subject gas by the second tube to a gas analyser, and obtaining a record of the inert gas concentration from the analyser, such concentration affording a measure of the flow velocity of the subject gas.

Means for carrying out the said method consists of an instrument for insertion into and along the duct which is conveying the subject gas, said instrument comprising an elongated body having a pair of tubular passages (e.g. two parallel tubes secured together) and means at one end for connecting said passages respectively to a source of argon or other inert gas, and a gas analyser and vacuum pump, said tubular passages spreading apart at their other ends (constituting the proximal end of the instrument) which are blanked off, each such other end being formed with a nozzle, said nozzles being co-axial with their orifices spaced apart and their common axis disposed normal to the general axis of the elongated body. Thus, in use, one of the passages feeds the inert gas to its nozzle, the gas issuing as a jet crossing the space separating the nozzle orifices, and entering the opposed nozzle, and the stream of subject gas intersects the jet.

An embodiment will be described in greater detail, by way of example (as applied to a bronchial flow meter where the instrument is inserted along one of the smaller elastic airways, internal diameter about 5 mm., inside the lung) with the aid of the accompanying drawings wherein:

FIGURE 1 is an elevation, partly in section, of the proximal end of an instrument for carrying out the method of the invention; and FIGURE 2 is a perspective view thereof, to a smaller scale, showing the same in position in an elastic bronchial airway and indicating the cooperating source of inert gas, gas analyser and vacuum pump.

In said embodiment the bronchial flow meter comprises an elongated body composed of two lengths 1 and 2 of stainless steel hypodermic tubing. The lengths of tubing are secured together for the greater part of their length, but spread apart to form an operating head at the proximal end to run parallel with each other and spaced apart where they are blanked off at 1a and 2a respectively. They are each formed with a nozzle 3 and 4 respectively. The nozzles 3 and 4 are co-axial with their orifices spaced apart, and their common axis is disposed normal to the general axis of the elongated tubular body into which the instrument is inserted. The two nozzles are aligned so that inert gas fed into the tube 1 from a source S and issuing from the nozzle 3 may pass accurately into the centre of the orifice of the other nozzle 4.

This operating head is protected by a wire cage formed by the annuli 5, longitudinals 6 and smooth-nosed curved parts 7. The cage elements are soldered to the tubes 1 and 2 holding them fixedly in requisite spaced relationship and forming an integral operating head. For use, as stated, in a small elastic bronchial airway 8 having a normal inner diameter of 5 mm., the overall diameter of the head would be in the region of 6 mm. and the length from the tip of the cage to the commencement of splaying of the tubes 1 and 2 is approximately 10 mm.

In use, a stream of an inert gas is passed into the tube 1 from source S and issues in a fine jet from the nozzle 3; it passes across the gap between the orifices of the tubes into the orifice of the opposed nozzle 4, being intersected en route by the stream of subject gas, which in the embodiment is bronchial gas passing along one of the smaller airways of the lung. The jet of inert gas is slightly deflected by the incidence of the bronchial gas, some inert gas passing away with the main bronchial gas stream, and the remanent inert gas plus some bronchial gas (the proportions being dependent upon the flow velocity of the latter) is conducted from the receiving nozzle 4 along the tube 2 to a gas analyser A and vacuum pump P. In the embodiment, the inert gas is argon, used in conjunction with a mass spectrometer, but any inert gas capable of analysis by a rapid gas analyser would be suitable. In particular, a nitrogen meter would be satisfactory.

I claim:

1. Method for determining the velocity of flow of a subject gas through a tubular duct consisting of leading an inert gas by a first tube to an open end thereof situated in the said duct, forcing the inert gas as a jet from said open end across the path of the subject gas to an open end of a second tube whereby it is deflected by the incidence of the stream of subject gas, the extent of deflection being dependent upon the flow velocity of the latter, whereupon the remanent inert gas jet is directed into the second tube, then conducting the remanent inert gas with any entrained subject gas by the second tube to a gas analyser, and obtaining a record of the inert gas concentration from the analyser, such concentration affording a measure of the flow velocity of the subject gas.

2. Means for determining the velocity of flow of a subject gas through a tubular duct consisting of an instrument for insertion into the duct which is conveying the subject gas, said instrument comprising an elongated body having a pair of substantially parallel tubular passages and means at one end for connecting said passages respectively to a source of inert gas and a gas analyser and vacuum pump, the general axis of said elongated body being substantially parallel to the flow direction of the subject gas, said tubular passages spreading apart at their other ends, constituting the proximal end of the instrument, which are blanked off, each such other end being formed with a nozzle, said nozzles being co-axial with their orifices spaced apart and facing each other and their common axis disposed normal to said general axis of the elongated body.

3. Means according to claim 2 in which the proximal end of the instrument is protected by an enclosing cage.

4. Means for determining the velocity of flow of a subject gas through a tubular duct consisting of an instrument for insertion into the duct which is conveying the subject gas, said instrument comprising an elongated body having a pair of substantially parallel tubular passages, means at one end for connecting said passages respectively to a source of inert gas and a gas analyser and vacuum pump, the general axis of said elongated body being substantially parallel to the flow direction of the subject gas, said tubular passages being spread apart at their other ends to form the proximal end of the instrument, and a pair of nozzles connected to said other ends of the tubular passages, said nozzles being co-axial with their orifices spaced apart and facing each other, the common axis of said nozzles being substantially transverse to the flow direction of the subject gas.

5. Means according to claim 4 including an enclosing cage protecting the proximal end of the instrument, said cage including members which blank off said other ends of the tubular passages beyond said nozzles.

No references cited.